US009295951B2

(12) United States Patent
Ito

(10) Patent No.: US 9,295,951 B2
(45) Date of Patent: Mar. 29, 2016

(54) GAS SEPARATION MEMBRANE

(71) Applicant: MITSUBISHI GAS CHEMICAL COMPANY, INC., Chiyoda-ku (JP)

(72) Inventor: Akira Ito, Yokkaichi (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 0 days.

(21) Appl. No.: 14/347,148

(22) PCT Filed: Sep. 18, 2012

(86) PCT No.: PCT/JP2012/073817
§ 371 (c)(1),
(2) Date: Mar. 25, 2014

(87) PCT Pub. No.: WO2013/047265
PCT Pub. Date: Apr. 4, 2013

(65) Prior Publication Data
US 2014/0230654 A1      Aug. 21, 2014

(30) Foreign Application Priority Data

Sep. 27, 2011   (JP) ................................. 2011-211637

(51) Int. Cl.
*B01D 53/22*    (2006.01)
*B01D 71/52*    (2006.01)
*B01D 69/02*    (2006.01)
*B01D 71/72*    (2006.01)

(52) U.S. Cl.
CPC ............... *B01D 71/52* (2013.01); *B01D 53/22* (2013.01); *B01D 53/228* (2013.01); *B01D 69/02* (2013.01); *B01D 71/72* (2013.01); *B01D 2053/221* (2013.01); *B01D 2323/12* (2013.01); *B01D 2325/20* (2013.01); *Y02C 10/10* (2013.01)

(58) Field of Classification Search
CPC ...... B01D 53/22; B01D 53/228; B01D 69/02; B01D 71/52; B01D 71/72; B01D 71/76; B01D 2053/221; B01D 2257/504
USPC ............................................... 96/4, 14; 95/51
See application file for complete search history.

(56) References Cited

U.S. PATENT DOCUMENTS 5,468,430 A * 11/1995 Ekiner ................... B01D 53/22
                                                      264/171.26
5,760,138 A *  6/1998 Shinohara ..................... 525/155
2003/0180425 A1    9/2003 Sanchez et al.
2006/0236857 A1   10/2006 Sanchez et al.
2007/0123617 A1 *  5/2007 Harashina .................... 524/189
2007/0260019 A1 * 11/2007 Ohme et al. .................. 525/400
2010/0004409 A1 *  1/2010 Schwittay et al. ............. 526/71
2011/0021703 A1 *  1/2011 Nomura et al. ................ 525/66
2011/0239700 A1 * 10/2011 Hasse .................. B01D 53/229
                                                      95/51
2012/0193827 A1 *  8/2012 Narayanan ..................... 264/49

FOREIGN PATENT DOCUMENTS

JP      57 207504          12/1982
JP      04-164932       *   6/1992 ................. C08J 5/18
JP    2004-155110 A    *   6/2004 ................. B29C 47/88
JP    2008-111139 A    *   5/2008 ................. C08J 9/26
WO      02 22245            3/2002

OTHER PUBLICATIONS

English langauge machine translation for Japanese Patent Application Publication JP 2008-111139, retrieved from www4.j-platpat.inpit.go.jp on Sep. 8, 2015.*
Patel, H. C. et al., "Molecular Modeling of Polymers 16. Gaseous Diffusion in Polymers: A Quantitative Structure-Property Relationship (QSPR) Analysis", Pharmaceutical Research, vol. 14, No. 10, pp. 1349-1354, (1997).
Vysokomolekulyarnye Soedineniya. Seriya B. Kratkie Soobshcheniya, vol. 24, No. 9, pp. 716-718, (1982).
Sharma, R. K. et al., "Copolymerization reactions of carbon dioxide", Preprints of Papers. American Chemical Society. Divison of Fuel Chemistry, vol. 45, No. 4, pp. 676-680, (2000).
Williams, J. L. et al., "The Diffusion of Gases and Water Vapor Through Grafted Polyoxymethylene" Journal of Applied Polymer Science, vol. 14, pp. 1949-1959, (1970).
Hwang, S. T. et al., "Gaseous Transfer Coefficients in Membranes", Separation Science, vol. 9, No. 6, pp. 461-478, (1974).
International Search Report Issued Dec. 18, 2012 in PCT/JP12/073817 Filed Sep. 18, 2012.

* cited by examiner

*Primary Examiner* — Jason M Greene
(74) *Attorney, Agent, or Firm* — Oblon, McClelland, Maier & Neustadt, L.L.P.

(57) ABSTRACT

The present invention relates to a gas separation membrane comprising as a main component a polyacetal, wherein the polyacetal contains 1.5 to 10 mol of an oxyalkylene unit based on 100 mol of an oxymethylene unit. The gas separation membrane of the present invention has high carbon dioxide gas separating ability and high permeability rate to carbon dioxide gas and is advantageously used as a separation membrane for carbon dioxide gas contained in exhaust gas.

15 Claims, No Drawings

GAS SEPARATION MEMBRANE

FIELD OF THE INVENTION

The present invention relates to a gas separation membrane comprising a specific polyacetal as a main component.

BACKGROUND ART

Polyacetal has excellent mechanical strength, excellent chemical resistance, and excellent wear resistance and further has excellent moldability, and therefore has been widely used as an engineering plastic in molding materials for engineering industrial parts, automobile parts, electric device parts, and other industrial products. However, whereas other thermoplastic resins have been applied to the use in the field of film, almost no polyacetal has been used as a film. One of the promising uses of polyacetal is a gas separation membrane, and it has been shown that polyacetal has high separating ability of $CO_2$, $NO_2$, and $SO_2$ from $N_2$ (the ratio of the gas permeability constant for $CO_2$, $NO_2$, or $SO_2$ to that for $N_2$ is high) (see, for example, patent document 1 and non-patent documents 1 and 2).

However, there is a strong demand for improving the gas separating ability and the gas permeability rate in the gas separation membrane comprising polyacetal for the industrial application.

PRIOR ART REFERENCES

Patent Document

Patent document 1: Japanese Examined Patent Publication No. Sho 64-9042

Non-Patent Documents

Non-patent document 1: The Diffusion of Gases and Water Vapor Through Grafted Polyoxymethylene, Journal of Applied Polymer Science, Vol. 14, pp. 1949-1959 (1970)
Non-patent document 2: Gaseous Transfer Coefficients in Membranes, Separation Science, 9 (6), pp. 461-478 (1974)

SUMMARY OF THE INVENTION

Problems to be Solved by the Invention

It is an object of the present invention to provide a gas separation membrane comprising a polyacetal having high $CO_2$ separating ability and high permeability rate to $CO_2$.

Means to Solve the Problems

The present inventors have made extensive and intensive studies focusing on the structure of polyacetal and the performance thereof as a gas separation membrane. As a result, it has been found that, by using a polyacetal having a specific structure, an excellent gas separation membrane having excellent ability to selectively separate $CO_2$ can be obtained, and the present invention has been completed.

Specifically, the present inventions are as follows:

[1] A gas separation membrane comprising as a main component a polyacetal, wherein the polyacetal contains 1.5 to 10 mol of an oxyalkylene unit having 2 or more carbon atoms based on 100 mol of an oxymethylene unit.

[2] The gas separation membrane according to item [1] above, wherein the polyacetal is a copolymer obtained from trioxane and a compound being copolymerizable with trioxane and capable of giving the oxyalkylene unit having 2 or more carbon atoms.

[3] The gas separation membrane according to item [2] above, wherein the compound being copolymerizable with trioxane and capable of giving the oxyalkylene unit having 2 or more carbon atoms is at least one member selected from a cyclic acetal, a cyclic ether, a vinyl ether, and an allyl ether.

[4] The gas separation membrane according to item [2] above, wherein the compound being copolymerizable with trioxane and capable of giving the oxyalkylene unit having 2 or more carbon atoms is at least one member selected from 1,3-dioxolane, 1,4-dioxepane, an alkyl glycidyl ether, a vinyl ether, and an allyl ether.

[5] The gas separation membrane according to item [1] above, which further comprises a thermoplastic resin.

[6] The gas separation membrane according to item [5] above, wherein the thermoplastic resin is a polyester or polyether resin.

[7] The gas separation membrane according to item [5] above, wherein the thermoplastic resin is at least one member selected from polylactic acid, polyhydroxybutyric acid, polyglycolic acid, polydioxolane, polyethylene glycol, polypropylene glycol, and polytetramethylene glycol.

[8] The gas separation membrane according to item [5] above, which contains 1 to 80 parts by mass of the thermoplastic resin based on 100 parts by mass of the polyacetal as a main component.

Effect of the Invention

The present invention can provide a gas separation membrane having excellent ability to selectively separate carbon dioxide gas ($CO_2$), as compared to a conventional gas separation polymer membrane. The gas separation membrane of the present invention is advantageously used as a separation membrane for carbon dioxide gas, particularly contained in exhaust gas in a great amount from, e.g., thermal power stations and plants.

MODE FOR CARRYING OUT THE INVENTION

The polyacetal used as a main component in the gas separation membrane of the present invention is a copolymer comprising an oxymethylene unit and an oxyalkylene unit having 2 or more carbon atoms, wherein the oxyalkylene unit having 2 or more carbon atoms is present in the copolymer in an amount of from 1.5 to 10 mol, based on 100 mol of the oxymethylene unit. Hereinafter, the polyacetal is referred to as "the polyacetal of the present invention".

In the polyacetal of the present invention, the oxyalkylene unit having 2 or more carbon atoms is preferably an oxyalkylene unit having 2 to 6 carbon atoms, more preferably an oxyalkylene unit having 2 to 4 carbon atoms, especially preferably an oxyalkylene unit having 2 or 3 carbon atoms. Either one type of or two or more types of the oxyalkylene unit having 2 or more carbon atoms may be used.

The polyacetal of the present invention can be obtained by a bulk polymerization method in which, for example, 1,3,5-trioxane is used as a monomer and a compound being copolymerizable with 1,3,5-trioxane and capable of giving the oxyalkylene unit having 2 or more carbon atoms is used as a comonomer and, if necessary, a cationic polymerization initiator, such as boron trifluoride, may be added. Examples of such comonomers include a cyclic acetal, a cyclic ether, a vinyl ether, and an allyl ether. Examples of cyclic acetals include 1,3-dioxolane, 1,4-dioxepane, and derivatives thereof, and especially preferred is 1,3-dioxolane. Examples of cyclic ethers include alkylene oxides having 2 to 6 carbon atoms, such as ethylene oxide and propylene oxide, epoxy compounds, and glycidyl ether compounds, and especially preferred are alkyl glycidyl ethers having 4 to 10 carbon atoms, such as butyl glycidyl ether and hexyl glycidyl ether. The vinyl ether and allyl ether mean compounds having a vinyl ether structure ($CH_2=CH-O-$) or an allyl ether structure ($CH_2=CH-CH_2-O-$), and examples include vinyl ethers or allyl ethers of a mono-, di-, tri-, or poly(ethylene glycol) monoalkyl ether. At least one comonomer is selected from these comonomers and introduced into the polyacetal so that the amount of the oxyalkylene unit having 2 or more carbon atoms falls in a predetermined range.

In the polyacetal of the present invention, an unit different from the oxymethylene unit and the oxyalkylene unit may be introduced in such an amount that the $CO_2$ separating ability and $CO_2$ permeability rate are not affected. As examples of additional comonomers capable of giving such a different unit, there can be mentioned cyclic siloxanes, such as decamethylsiloxane.

With respect to the amount of the comonomer incorporated into the polyacetal of the present invention, the oxyalkylene unit having 2 or more carbon atoms (derived from the comonomer) are preferably present in an amount of 1.5 to 10 mol, especially preferably 2 to 6 mol, based on 100 mol of the oxymethylene unit (derived mainly from trioxane). As the comonomer, 1,3-dioxolane or 1,4-dioxepane is preferably used. The amount of the comonomer incorporated can be calculated from the amounts of the monomer and comonomer charged or, e.g., NMR spectrum data for the resultant copolymer.

The polyacetal of the present invention preferably has a melt index in the range of from 0.5 to 50 g/10 minutes.

The gas separation membrane of the present invention is obtained by forming a film from the polyacetal of the present invention or a composition comprising the polyacetal as a main component. In the composition, another thermoplastic resin may be added, or an antioxidant, a heat stabilizer, or another required additive may be added in a small amount. In the present invention, the expression "comprising (the polyacetal) as a main component" means that the composition (or the gas separation membrane of the present invention) contains the polyacetal of the present invention in an amount of at least 50% by mass, preferably 60% by mass or more.

With respect to the thermoplastic resin which the composition (or the gas separation membrane of the present invention) can contain, there is no particular limitation as long as it does not markedly lower the heat resistance of the gas separation membrane and does not adversely affect the $CO_2$ separating ability and $CO_2$ permeability rate of the polyacetal of the present invention, and examples of the thermoplastic resins include polyester and polyether resins. Examples of polyester resins include polylactic acid, polyhydroxybutyric acid, and polyglycolic acid. Examples of polyether resins include polydioxolane, polyethylene glycol, polypropylene glycol, and polytetramethylene glycol. As the thermoplastic resin, using polylactic acid and/or polydioxolane is preferred. The amount of the thermoplastic resin added is preferably in the range of from 1 to 80 parts by mass, based on 100 parts by mass of the polyacetal of the present invention.

The gas separation membrane of the present invention can be produced by a method known to a person skilled in the art from the polyacetal of the present invention or a composition comprising the polyacetal as a main component. For example, the gas separation membrane of the present invention is preferably used in the form of a film obtained from the polyacetal of the present invention or a composition comprising the polyacetal as a main component by hot-pressing or a melt extrusion method, or a monoaxially or biaxially oriented film obtained therefrom.

Further, the gas separation membrane of the present invention may be a film obtained by dissolving the polyacetal of the present invention or a composition comprising the polyacetal as a main component in an appropriate solvent and casting the resultant solution and drying it. Examples of the solvents include hexafluoroisopropanol, and high boiling-point solvents (capable of dissolving the polyacetal or composition at a temperature higher than 100° C.), such as dimethyl sulfoxide, dimethylformamide, dimethylacetamide, N-methylpyrrolidone, and benzyl alcohol.

The form of the gas separation membrane of the present invention is not limited to a film, and the gas separation membrane can be used in a known form, such as a tube or hollow fibers.

Hereinbelow, the present invention will be described with reference to the following Examples. All the monomers, comonomers, catalysts, thermoplastic resins, solvents, and others used in the present invention are commercially available or can be prepared by a method known to a person skilled in the art.

Examples 1 to 12 and Comparative Examples 1 and 2

Using, as a polymerization apparatus, a bench twin-screw kneader having an internal capacity of 1,000 cc, having a Z-type blade inside the kneader, and having a jacket structure capable of circulating warm water therethrough, a polyacetal was produced by polymerization in a batchwise manner.

Warm water at 70° C. was circulated through the jacket, and the inside of the kneader was heated and dried using a heat gun in a state in which a cover was removed from the kneader, and then the cover was attached to the kneader and the system was purged with nitrogen. 200 g of 1,3,5-trioxane and the comonomer in a predetermined amount shown in Table 1 below were charged from the raw material inlet, and the resultant mixture was stirred at a high speed, and then boron trifluoride diethyl etherate in a catalytic amount (0.04 mmol, based on 1 mol of 1,3,5-trioxane) was added to the mixture to perform a polymerization for 20 minutes. Then, a triethylamine/benzene solution was added to the resultant mixture to terminate the reaction, and the polyacetal was removed from the system and ground using a mixer to obtain a crude polyacetal copolymer. A solids content of the resultant crude polyacetal copolymer was calculated as a yield. As a result, with respect to all the resultant polyacetal copolymers, the yield was 90% or more.

Then, to 100 parts by mass of the above resultant crude polyacetal copolymer were added 0.3 part by mass of triethylene glycol bis[3-(3-t-butyl-5-methyl-4-hydroxyphenyl) propionate] (trade name: Irganox 245; manufactured by BASF AG), 0.1 part by mass of melamine, 0.05 part by mass of magnesium hydroxide, and the thermoplastic resin in a predetermined amount shown in Table 1 below, and the resultant mixture was uniformly mixed, and then transferred to a small-size mixer (trade name: Labo Plasto Mill; manufactured by Toyo Seiki Seisaku-Sho, Ltd.) and melt-kneaded at 220° C. for 20 minutes. With respect to the thus resultant composition, a film having a thickness of 100 μm was prepared using a hydraulic press heated to 200° C., and evaluated in the permeability rate to $CO_2$ and $N_2$ gas and separating ability.

A gas permeability (unit: $cm^3 \cdot cm/cm^2 \cdot s \cdot cmHg$) was measured by a differential pressure method in accordance with JIS K7126. Specifically, gas chromatography was used as a detector, and a differential pressure type gas•water vapor permeability measurement apparatus (GTR-30XAD, G6800T•F(S)) (manufactured by GTR Tec Corporation, Yanaco Technical Science) was used. The differential pressure for the test was 1 atm, and gas in a dry state was used. The test temperature was 23±2° C., and the permeation area was $1.52 \times 10^{-3}$ m$^2$ ($\phi 4.4 \times 10^{-2}$ m). The results are also shown in Table 1.

Synthesis Example

Production of Polydioxolane

The polydioxolane used in Examples 10 to 12 as a thermoplastic resin was produced as follows.

As a polymerization apparatus, the same apparatus as that used in the production of the polyacetal was used.

TABLE 1

|  |  |  | Example | | | | | | |
|---|---|---|---|---|---|---|---|---|---|
|  |  |  | 1 | 2 | 3 | 4 | 5 | 6 | 7 |
| Polyacetal | 1,3,5-Trioxane | g | 200 | 200 | 200 | 200 | 200 | 200 | 200 |
|  | Comonomer (1) | g | DOL 13.7 | DOL 20.6 | DOL 31.5 | DOL 31.5 | DOX 17.4 | DOL 20.6 | DOL 20.6 |
|  | Comonomer (2) | g | — | — | — | — | — | BG 1.0 | MA 1.0 |
|  | Amount of oxyalkylene units*1 based on relative to 100 mol of oxymethylene units | mol | 2.7 | 4 | 6 | 6 | 2.1 | 4 | 4 |
| Film composition | Polyacetal | Part(s) by mass | 100 | 100 | 100 | 100 | 100 | 100 | 100 |
|  | Thermoplastic resin | Part(s) by mass |  |  |  | PLA 3.0 |  |  |  |
|  | Antioxidant*2 | Part(s) by mass | 0.3 | 0.3 | 0.3 | 0.3 | 0.3 | 0.3 | 0.3 |
|  | Melamine | Part(s) by mass | 0.1 | 0.1 | 0.1 | 0.1 | 0.1 | 0.1 | 0.1 |
|  | Magnesium hydroxide | Part(s) by mass | 0.05 | 0.05 | 0.05 | 0.05 | 0.05 | 0.05 | 0.05 |
| Evaluation |  |  |  |  |  |  |  |  |  |
| Gas permeability constant | CO$_2$ Permeability ($\times 10^{-12}$) | *3 | 101 | 150 | 207 | 204 | 103 | 156 | 161 |
|  | O$_2$ Permeability ($\times 10^{-12}$) | *3 | 4.1 | 4.7 | 6.1 | 6.6 | 4.0 | 4.8 | 4.7 |
|  | N$_2$ Permeability ($\times 10^{-12}$) | *3 | 1.2 | 1.6 | 1.9 | 2.0 | 1.2 | 1.6 | 1.6 |
| Gas separating ability | CO$_2$/N$_2$ |  | 84 | 97 | 109 | 102 | 87 | 100 | 101 |
|  | CO$_2$/O$_2$ |  | 25 | 32 | 34 | 31 | 26 | 33 | 34 |

|  |  |  | Example | | | | | Comparative Example | |
|---|---|---|---|---|---|---|---|---|---|
|  |  |  | 8 | 9 | 10 | 11 | 12 | 1 | 2 |
| Polyacetal | 1,3,5-Trioxane | g | 200 | 200 | 200 | 200 | 200 | 200 | 200 |
|  | Comonomer (1) | g | DOL 20.6 | DOL 26.0 | DOL 26.0 | DOL 26.0 | DOL 26.0 | DOL 7.0 | DOL 7.0 |
|  | Comonomer (2) | g | TVE 1.0 | — | — | — | — | — | — |
|  | Amount of oxyalkylene units*1 based on relative to 100 mol of oxymethylene units | mol | 4 | 5 | 5 | 5 | 5 | 1.4 | 1.4 |
| Film composition | Polyacetal | Part(s) by mass | 100 | 100 | 100 | 100 | 100 | 100 | 100 |
|  | Thermoplastic resin | Part(s) by mass |  |  | PDOL 11.1 | PDOL 25.0 | PDOL 66.7 |  | PEG 3.0 |
|  | Antioxidant*2 | Part(s) by mass | 0.3 | 0.3 | 0.3 | 0.3 | 0.3 | 0.3 | 0.3 |
|  | Melamine | Part(s) by mass | 0.1 | 0.1 | 0.1 | 0.1 | 0.1 | 0.1 | 0.1 |
|  | Magnesium hydroxide | Part(s) by mass | 0.05 | 0.05 | 0.05 | 0.05 | 0.05 | 0.05 | 0.05 |
| Evaluation |  |  |  |  |  |  |  |  |  |
| Gas permeability constant | CO$_2$ Permeability ($\times 10^{-12}$) | *3 | 154 | 107 | 446 | 742 | 494 | 54 | 56 |
|  | O$_2$ Permeability ($\times 10^{-12}$) | *3 | 4.6 | 4.6 | 15.5 | 28.5 | 16.7 | 2.8 | 2.7 |
|  | N$_2$ Permeability ($\times 10^{-12}$) | *3 | 1.6 | 1.1 | 5.1 | 8.4 | 5.3 | 0.8 | 0.8 |
| Gas separating ability | CO$_2$/N$_2$ |  | 99 | 101 | 87 | 89 | 93 | 64 | 70 |
|  | CO$_2$/O$_2$ |  | 33 | 23 | 29 | 26 | 30 | 19 | 21 |

*1 Alkylene has 2 or more carbon atoms.
*2 Triethylene glycol bis[3-(3-t-butyl-5-methyl-4-hydroxyphenyl)propionate] (trade name: Irganox 245, manufactured by BASF AG)
*3: cm$^3$·cm/cm$^2$·s·cmHg
DOL: 1,3-Dioxolane
DOX: 1,4-Dioxepane
BG: n-Butyl glycidyl ether
MA: Methoxypolyethylene glycol allyl ether (molecular weight: 200)
TVE: Triethylene glycol monomethyl vinyl ether
PLA: Polylactic acid (Terramac TE-2000, manufactured by Unitika Ltd.)
PDOL: Polydioxolane
PEG: Polyethylene glycol (molecular weight: 20,000)

Warm water at 50° C. was circulated through the jacket, and the inside of the kneader was heated and dried using a heat gun in a state in which a cover was removed from the kneader, and then the cover was attached to the kneader and the system was purged with nitrogen. 200 g of 1,3-dioxolane was charged from the raw material inlet, and, while stirring at a high speed, based on 100 parts by mass of the charged 1,3-dioxolane, 0.003 part by mass of phosphotungstic acid was added to perform a polymerization for 20 minutes. Then, a triethylamine/benzene solution was added to the resultant mixture to terminate the reaction. Then, a solution obtained by adding triethylamine in an amount of 1 wt % to water: methanol=4:1 (volume ratio), and the polydioxolane were placed in a mixer, and mixed with each other to completely terminate the reaction and to remove the remaining monomer. The solid material was collected by filtration, and then washed with acetone, followed by vacuum drying at room temperature. A yield was calculated from the solids content of the resultant material. As a result, the yield was found to be 75%. Further, a melt index (MI value) was measured in accordance with ASTM-D1238 (under a load of 2.16 kg) wherein the measurement temperature was changed to 100° C. As a result, the MI value was found to be 1.6.

INDUSTRIAL APPLICABILITY

The gas separation membrane (Examples 1 to 12) comprising as a main component the polyacetal of the present invention, which contains the oxyalkylene unit, derived from a comonomer, having 2 or more carbon atoms in a predetermined amount, had high gas permeability and excellent ability to selectively separate carbon dioxide gas ($CO_2$) from oxygen gas and nitrogen gas, particularly from nitrogen gas, as compared to the conventional gas separation polymer membrane (Comparative Examples 1 and 2). Therefore, the gas separation membrane of the present invention is expected to be useful as a separation membrane for carbon dioxide gas contained in exhaust gas in a great amount from, e.g., thermal power stations and plants.

The invention claimed is:

1. A gas separation method, comprising:
permeating a raw material gas comprising carbon dioxide gas and at least one of oxygen gas and nitrogen gas through a membrane, thereby separating the carbon dioxide gas from the raw material gas,
wherein the membrane comprises as a main component a polyacetal, and
the polyacetal comprises 1.5 to 10 mol of an oxyalkylene unit having 2 or more carbon atoms based on 100 mol of an oxymethylene unit.

2. The method according to claim 1, wherein the polyacetal is a copolymer obtained from trioxane and a compound copolymerizable with trioxane and capable of giving the oxyalkylene unit having 2 or more carbon atoms.

3. The method according to claim 2, wherein the compound is at least one selected from the group consisting of a cyclic acetal, a cyclic ether, a vinyl ether, and an allyl ether.

4. The method according to claim 2, wherein the compound is at least one selected from the group consisting of 1,3-dioxolane, 1,4-dioxepane, an alkyl glycidyl ether, a vinyl ether, and an allyl ether.

5. The method according to claim 1, wherein the membrane further comprises a thermoplastic resin.

6. The method according to claim 5, wherein the thermoplastic resin is a polyester or polyether resin.

7. The method according to claim 5, wherein the thermoplastic resin is at least one selected from the group consisting of a polylactic acid, a polyhydroxybutyric acid, a polyglycolic acid, a polydioxolane, a polyethylene glycol, a polypropylene glycol, and a polytetramethylene glycol.

8. The method according to claim 5, wherein the membrane comprises 1 to 80 parts by mass of the thermoplastic resin, based on 100 parts by mass of the polyacetal.

9. The method according to claim 1, wherein the membrane is in a form of a film, a tube, or a hollow fiber.

10. The method according to claim 1, wherein the membrane has a thickness of 100 μm.

11. The method according to claim 1, wherein the raw material gas comprises carbon dioxide gas and nitrogen gas.

12. The method according to claim 1, wherein the raw material gas comprises carbon dioxide gas and oxygen gas.

13. The method according to claim 1, wherein the raw material gas comprises carbon dioxide gas, oxygen gas, and nitrogen gas.

14. The method according to claim 2, wherein the compound is at least one of 1,3-dioxolane and 1,4-dioxepane.

15. The method according to claim 14, wherein the membrane has a thickness of 100 μm.

* * * * *